Sept. 19, 1933.  A. C. LILLMARS ET AL  1,927,815
LIQUID DISPENSING APPARATUS
Filed March 1, 1932   3 Sheets-Sheet 3
FIG. III.
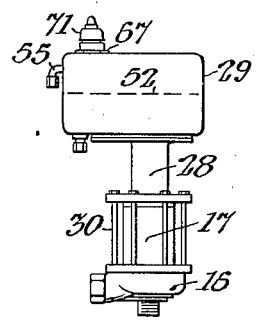
FIG. IV.
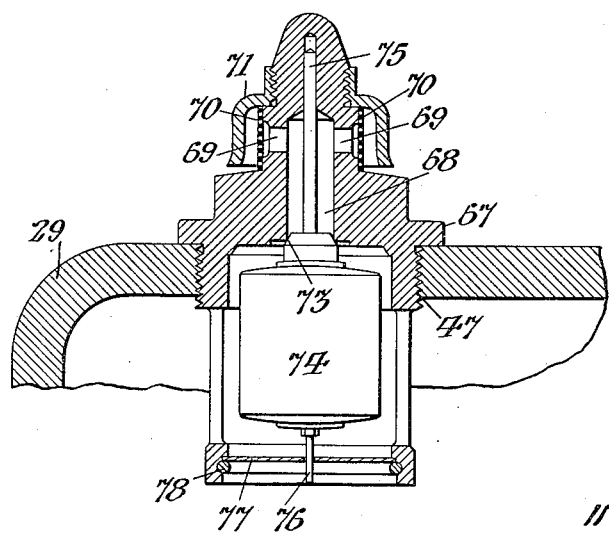
INVENTORS:
ARVID C. LILLMARS AND
JOSEPH C. WOODFORD,
BY Patented Sept. 19, 1933

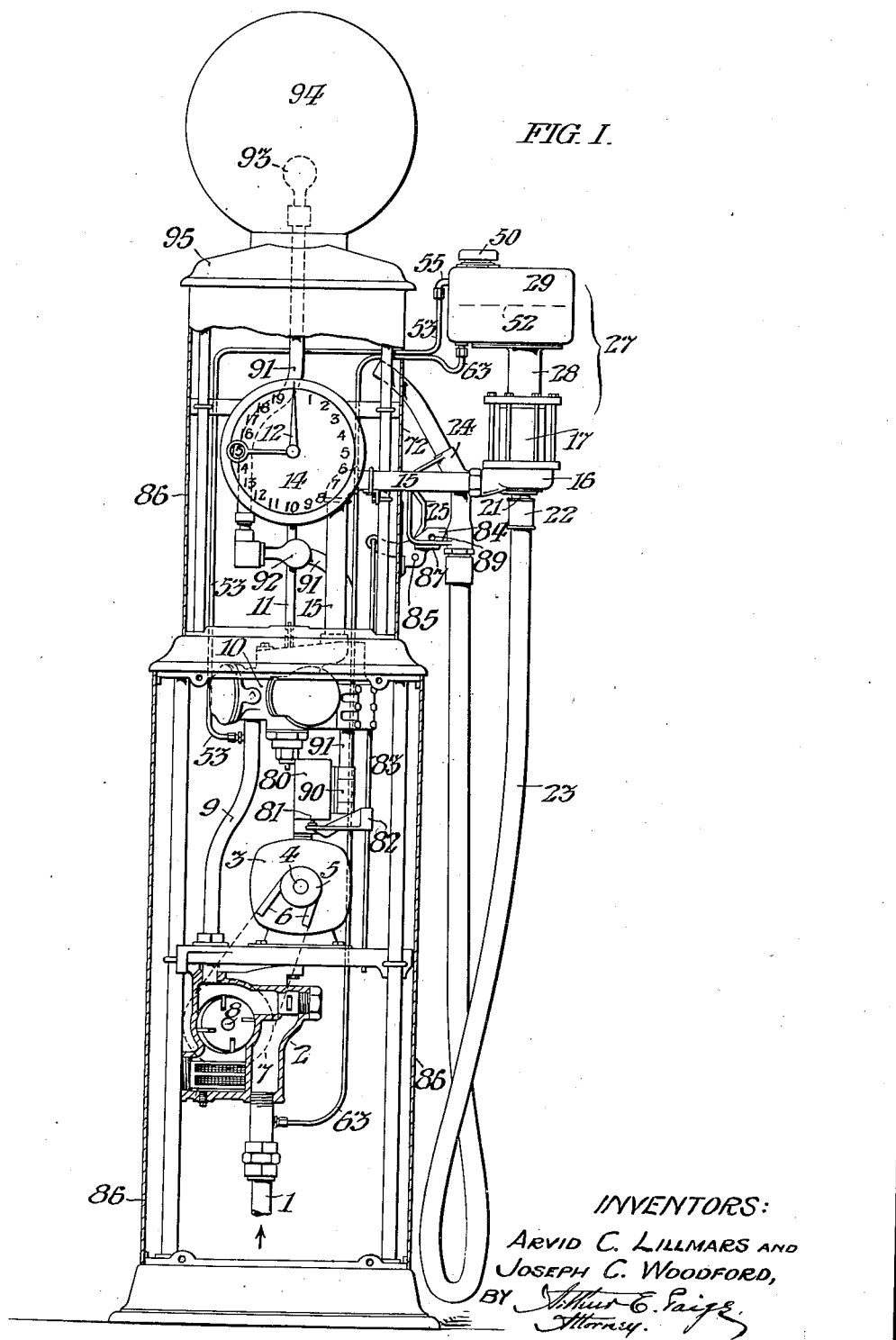

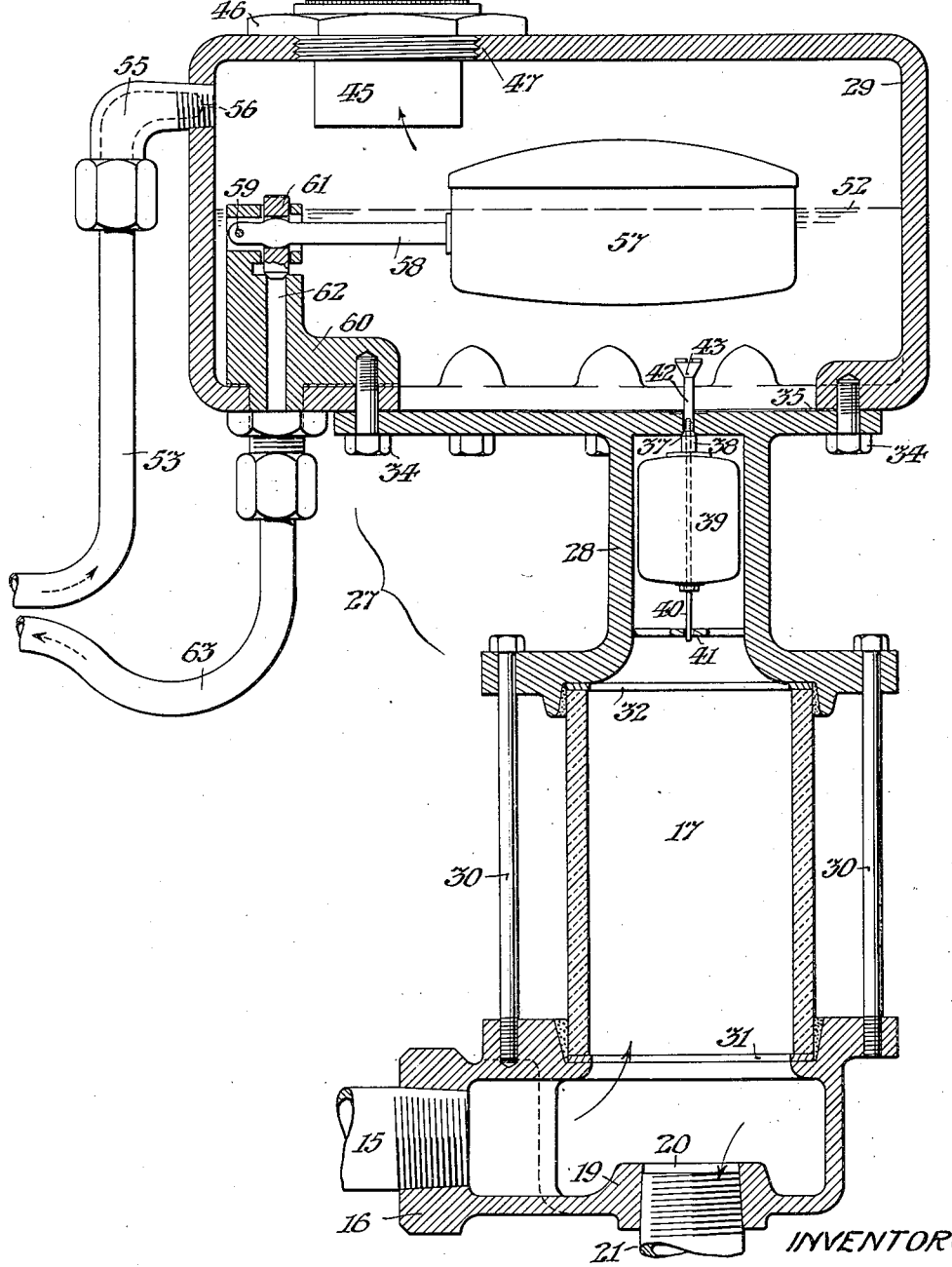

1,927,815

UNITED STATES PATENT OFFICE 1,927,815

LIQUID DISPENSING APPARATUS

Arvid C. Lillmars, Upper Darby, and Joseph C. Woodford, Ardmore, Pa.

Application March 1, 1932. Serial No. 595,996

5 Claims. (Cl. 221—95)

Our invention may be advantageously applied to apparatus for dispensing gasolene by means of a pump which extracts the liquid from an underground tank and delivers it under pressure through a flow meter and dispensing hose; the latter being provided with a dispensing nozzle including a manually operative valve which, when released by the operator, is automatically shut to retain the liquid in the hose. Said meter includes a rotatable index pointer adapted to traverse a circular series of graduations on a dial to indicate gallons and fractions thereof dispensed, and said pointer is turned by the flow of fluid through said meter. In some localities, the law requires the inclusion of a sight gage, including a transparent container, between the pump and the hose, through which the liquid must pass to be dispensed and in which the purchaser may observe whether or not liquid is being delivered to the hose. The gasolene in said tank is normally at a temperature different from that of the atmosphere, to which said hose is exposed, and the metered volume of gasolene left standing in the conduit from said meter to the nozzle valve will expand if exposed to increased temperature of summer atmosphere and sunlight or contract if exposed to winter atmosphere, and, in the latter case, the sight gage would show a body of vapor above the liquid therein. Therefore, the principal object and effect of our invention is to provide means for not only automatically maintaining that portion of the dispensing conduit completely filled with liquid, but to provide a vent to the atmosphere to relieve pressure due to increase in temperature and expansion of the liquid; so as to facilitate the delivery of liquid without the inclusion of bubbles of lighter fluid and to the full amount indicated by the meter. It is to be noted that the refilling operation above contemplated is effected between successive dispensing operations and when the pump is not operating.

There are many installations of gasolene dispensing apparatus including what are known as curb pump stands, of costly construction, but entirely devoid of any means for effecting the functions of our invention. Therefore, as hereinafter described, we embody our invention in a unitary structure which may be used as an accessory to such installations of liquid dispensing apparatus and which may be manufactured and sold entirely separate from any pump stand but may be readily connected with any such stand exterior to the casing thereof, and between it and the dispensing hose leading therefrom, and by comparatively unskilled labor.

In the form of our invention hereinafter described, such a unitary accessory structure includes a sight gage with a transparent container as aforesaid in connection with a reservoir for liquid with valve means for automatically replacing with liquid any vapor or other lighter fluid vented from the portion of the dispensing conduit aforesaid. We prefer to provide such accessory unit with a vent to the atmosphere having means to prevent access of exterior flame to the interior of the accessory casing, and discharge of liquid through said vent.

It is characteristic of the form of our invention hereinafter described that there is a liquid reservoir in such accessory structure above the transparent container, which is supplied with liquid by the same pump which supplies the liquid to be dispensed directly through the hose. Said reservoir is in communication with said container through a conduit automatically controlled by a float valve so that the gasolene vapor, or other gaseous fluid, is eliminated from the transparent container and replaced by liquid gravitating therein from said reservoir; so as to continuously maintain the transparent container filled with liquid, without the attention of the operator.

Our invention includes the various novel features of construction and arrangement hereinafter more definitely specified.

In said drawings; Fig. I is a partly sectional elevation of liquid dispensing apparatus of the type known as a curb stand, with an accessory structure embodying our invention applied thereto in cooperative relation therewith.

Fig. II is a vertical sectional view of said accessory structure shown in Fig. I, but on a larger scale.

Fig. III is a side elevation of an accessory unit embodying our invention with a float valve controlling the vent to the atmosphere.

Fig. IV is a vertical sectional view of the vent float valve with its appurtenances included in the structure shown in Fig. III, but on a larger scale than the latter.

In said figures; the liquid to be dispensed is stored in an underground tank from which it is withdrawn through the conduit 1 by and to the pump 2 which is conveniently operated by the electric motor 3 having the armature shaft 4 provided with the pulley 5 connected by the belt 6 with the pulley 7, which is operatively connected with the rotor 8 of said pump 2. Said pump 2 discharges the liquid through the conduit 9 into the flow meter casing 10 which contains mechanism for turning the shaft 11 which is operatively connected with the rotary hand 12 which traverses the graduations on the circular dial 14, to indicate the volume of fluid dispensed through said flow meter from the conduit 9 to the conduit 15. Said conduit 15 leads into the base 16 of the sight gage comprising the transparent container 17 through which the quantity of liquid therein may be observed by the purchaser.

As shown in Fig. II, said base 16 has the boss 19 on the bottom thereof tending to direct the liquid upwardly into said transparent container 17 before permitting it to escape through the port 20 into the conduit 21 which, as shown in Fig. I, is connected by the coupling 22 with the flexible dispensing hose 23 which has the nozzle 24 at its discharge end carrying the lever 25 for operating a valve in said nozzle controlling the dispensation of liquid therethrough.

As shown; said sight gage base 16 and transparent container 17 are parts of our improved unitary accessory structure 27, which includes the valve casing 28 and the reservoir casing 29. Said valve casing 28 is detachably rigidly connected with said gage base 16 by the circular series of cap bolts 30 which hold said transparent container 17 with its bottom edge sealed in liquid tight relation with said base 16 by the gasket 31 and also holds the top edge of said container 17 sealed in liquid tight relation with the valve casing 28 by the gasket 32. Said valve casing 28 is also detachably rigidly connected with the reservoir casing 29 by the annular series of tap bolts 34; the joint between said valve casing 28 and reservoir casing 29 being sealed by the gasket 35. Said valve casing 28 has the vent port 37 in the top thereof to permit the escape of air and other gaseous fluid from the transparent container 17. Said port 37 is adapted to be controlled and normally shut by the valve 38 which is mounted upon the top of the float 39; the latter having the guide stem 40 at its lower end loosely fitted in the bearing 41 fixed in said valve casing 28. The upper end of said valve 38 is provided with the stem 42 having at the top thereof the conical valve head 43 which is adapted to seat itself at the upper end of said port 37 and prevent the accidental escape of the liquid from said reservoir 29, if and when the hose 23 be accidentally ruptured. Said valve head 43 has no function during the normal condition and operation of the device. If the hose 23 be exposed to atmospheric temperature for any considerable period of time, a portion of the gasolene may vaporize therefrom and accumulate in the upper portion of the transparent container 17 if it were not for the provision of said vent port 37. If and when accumulation of air or such gasolene vapor in the valve chamber 28 lowers the normal level of gasolene therein which normally sustains the float 39 to maintain the valve 38 in position to close said port 37; said float 39 is permitted to subside and open said port for the escape of the lighter fluid therethrough into the upper portion of the reservoir casing 29 with contemporaneous gravitation of the liquid from said casing 29 to replace the escaped fluid and refill the valve casing 28 with liquid until the valve float 39 is uplifted to its normal position shown. Such lighter fluid is permitted to escape from the upper portion of said reservoir casing through the outlet tube 45 which is carried by the screw plug 46 normally closing the opening 47 affording access to the interior of said reservoir casing 29. The upper end of said outlet tube 45 is provided with the foraminous flame arrester screen 48 which permits the escape of gaseous fluid but prevents the ingress of any outside flame to the explosive atmosphere in said reservoir 29. The cap 50 which overhangs said screen 48 and is in rigid relation with the tube 45, serves to shed rain and other moisture away from said screen. Said tube 45 may be removed to charge said reservoir 29 with liquid, as indicated at 52, by pouring it through the opening 47, or otherwise. However, we prefer to provide means for automatically maintaining said reservoir 29 charged with liquid to replace the gasolene vapor or other gasolene fluid eliminated from the transparent container 17, as follows:

Said reservoir 29 is normally charged with gasolene to the level indicated by the dash line 52 in Figs. I and II by way of the conduit 53 which, as shown in Fig. I, leads from the main liquid conduit 9 below the meter 10, to the elbow fitting 55 which, as shown in Fig. II, has the jet opening 56 leading into said reservoir casing 29. Said jet opening 56 is small but sufficient to insure that the reservoir 29 is continuously supplied with gasolene to the level 52 by the operation of the single pump 2 which thus supplies gasolene simultaneously through the conduit 15 to the hose 23 and also through said conduit 53 and jet opening 56 to said reservoir 29. If and when the gasolene rises above that level, as it will when there is normal demand for dispensation of liquid, it uplifts the float 57 which is carried by the lever 58 fulcrumed at 59 in the bracket fitting 60 and carries the reciprocatory valve 61 in registry with the outlet conduit 62 which leads from said reservoir 29 to the conduit 63 extending down in the pump stand casing in communication with the pump intake conduit 1, as shown in Fig. I. Said outlet conduit 62 which is normally closed by said valve 61 in the position shown in Fig. II is thus opened, whenever the liquid rises above the level 52, to permit the surplus liquid to drain back into the pump intake conduit 1. The conduit 53, reservoir 29, and conduit 63 thus form a bypass around the pump 2, from the outlet to the inlet side thereof and thus serve to continually automatically maintain a supply of liquid in said reservoir merely by the operation of said pump 2, and without requiring the attention of the operator.

Although said atmospheric vent 45 and its appurtenances are efficient to permit the escape of gasolene vapor while preventing the ingress of flame as above described, we prefer to provide means to automatically close an atmospheric vent from the reservoir 29 and prevent escape of liquid should said reservoir become completely filled with liquid by any abnormal operation or lack of operation of the other parts of the apparatus. We have shown such means in Figs. III and IV; wherein the atmospheric vent port 47 in the reservoir 29 is provided with the screw plug 67 having the vent conduit 68 with branches 69 leading to the atmosphere through the flame arrester screen 70. Said screen is removably secured in the assembled position shown by the weathering cap 71 which overhangs it and is in screw threaded engagement with said plug. The valve 73 is carried by the float 74 and has the stem 75 mounted to reciprocate in said plug, and the stem 76 mounted to reciprocate in the diaphragm 77 which is detachably held in said plug by the spring ring 78. During the normal operation of the apparatus, said float 74 rests upon said diaphragm 77 but, if and when it is uplifted by an abnormal influx of liquid to said reservoir 29, it closes said vent conduit 68 as shown in Fig. IV and prevents the discharge of any liquid therethrough.

In the form of curb pump stand shown, said electric motor 3 is conveniently controlled by an electric switch in the casing 80 and including the push button 81 which, when in the position shown in Fig. I, is open to break the motor circuit and stop the operation of the pump 2. As shown, said switch is normally held in that open position by the arm 82 on the vertically reciprocatory slide rod 83 which is pivotally connected at its upper end with the hose supporting lever 84 which is fulcrumed at 85 in connection with the pump stand casing 86; so that when the nozzle 24 is hung on said lever 84 with its weight and that of the hose supported by the flange 87 on said lever, as shown, such weight lifts said rod 83 to the position shown. Said lever 84 is conveniently provided with the opening 89 to receive the hasp of a padlock, whereby the nozzle may be detained in inoperative position when desired, with its discharge end projecting into the pump stand through an opening in said casing 86, as shown in Fig. I.

The electric conductors leading to said motor 3 are conveniently encased in the conduit 90 and the branch conduit 91 leads upwardly therefrom supporting the incandescent lamps 92 and 93 respectively for illuminating said dial 14 and the translucent lamp casing 94 on the dome 95 at the top of said casing 86.

However, the construction and arrangement of the curb pump stand and its appurtenances chosen for illustration are merely typical of any such apparatus to which our accessory refill and expansion vent device 27 may be applied exterior to its casing. Therefore, we do not desire to limit ourselves to the precise details of construction, arrangement, or method of operation herein set forth, as it is obvious that various modifications may be made therein without departing from the essential features of our invention, as defined in the appended claims.

We claim:

1. In liquid dispensing apparatus; a unitary structure including the combination with a transparent container having an inlet and an outlet through which the liquid is dispensed, and a liquid reservoir above the level of said container, having a vent to the atmosphere; of conduit means connecting said container with said reservoir, for conveying gaseous fluid from said container to said reservoir, to escape to the atmosphere, and for conveying liquid by gravity from said reservoir to said container to replace the escaped fluid; and means for supplying said container and reservoir with liquid to be dispensed through said container, comprising a single pump and conduits leading therefrom to said reservoir and container; whereby said container is automatically maintained charged with liquid to a predetermined level, without the attention of the operator.

2. Apparatus as in claim 1; wherein the reservoir is connected with the pump by two conduits respectively leading from the discharge outlet of the pump to the upper portion of the reservoir, and from the bottom of the reservoir to the inlet of the pump.

3. Apparatus as in claim 1; wherein the reservoir is connected with the pump by two conduits respectively leading from the discharge outlet of the pump to the upper portion of the reservoir, and from the bottom of the reservoir to the inlet of the pump, and the latter conduit is controlled by a valve, and a float for automatically operating said valve, in accordance with the level of liquid in said reservoir; whereby any liquid deposited in said reservoir above a predetermined level is automatically returned to the suction side of the pump.

4. In liquid dispensing apparatus; a unitary structure including a transparent container having an inlet and outlet through which the liquid is dispensed, and a liquid reservoir above the level of said container, having a vent to the atmosphere; of conduit means connecting said container with said reservoir, for conveying gaseous fluid from said container to said reservoir, to escape to the atmosphere, and for conveying liquid from said reservoir to said container to replace the escaped fluid; means for supplying said container and reservoir with liquid to be dispensed through said container, comprising a single pump and conduits leading therefrom to said reservoir and container; the conduit to said reservoir being of extremely restricted area in proportion to the area of the conduit leading to said container, whereby the greater portion of the liquid from said pump is delivered directly to said container, but sufficient liquid is delivered to said reservoir to automatically maintain said container charged with liquid to a predetermined level, without the attention of the operator.

5. Apparatus as in claim 4; including a drain conduit from said reservoir to the intake side of said pump; and means for maintaining the drain outlet from said reservoir continually submerged in liquid, and thereby preventing suction of gaseous fluid to said pump through said drain outlet.

ARVID C. LILLMARS.
JOSEPH C. WOODFORD.